United States Patent
Oura et al.

(10) Patent No.: US 9,340,694 B2
(45) Date of Patent: May 17, 2016

(54) SUBLIMATING DYE INK FOR INK JETS AND DYEING METHOD

(71) Applicant: Kiwa Chemical Industry Co., Ltd., Wakayama-shi, Wakayama (JP)

(72) Inventors: Tadashi Oura, Wakayama (JP); Hiroki Tanaka, Wakayama (JP)

(73) Assignee: Kiwa Chemical Industry Co., Ltd., Wakayama (JP)

( * ) Notice: Subject to any disclaimer, the term of this patent is extended or adjusted under 35 U.S.C. 154(b) by 0 days.

(21) Appl. No.: 14/394,486

(22) PCT Filed: Feb. 7, 2014

(86) PCT No.: PCT/JP2014/052922
§ 371 (c)(1),
(2) Date: Oct. 15, 2014

(87) PCT Pub. No.: WO2014/129322
PCT Pub. Date: Aug. 28, 2014

(65) Prior Publication Data
US 2015/0116418 A1  Apr. 30, 2015

(30) Foreign Application Priority Data
Feb. 21, 2013  (JP) ................................ 2013-032053

(51) Int. Cl.
| | | |
|---|---|---|
| C09D 11/38 | (2014.01) | |
| B41J 2/01 | (2006.01) | |
| C08K 5/053 | (2006.01) | |
| C08K 5/18 | (2006.01) | |
| C08K 5/315 | (2006.01) | |
| C08K 5/3437 | (2006.01) | |
| C08K 5/41 | (2006.01) | |
| C09D 125/08 | (2006.01) | |
| C09D 11/10 | (2014.01) | |
| C09D 11/328 | (2014.01) | |
| D06P 5/30 | (2006.01) | |
| D06P 5/28 | (2006.01) | |
| D06P 1/48 | (2006.01) | |
| D06P 1/52 | (2006.01) | |
| D06P 1/651 | (2006.01) | |

(52) U.S. Cl.
CPC . *C09D 11/38* (2013.01); *B41J 2/01* (2013.01); *C08K 5/053* (2013.01); *C08K 5/18* (2013.01); *C08K 5/315* (2013.01); *C08K 5/3437* (2013.01); *C08K 5/41* (2013.01); *C09D 11/10* (2013.01); *C09D 11/328* (2013.01); *C09D 125/08* (2013.01); *D06P 1/48* (2013.01); *D06P 1/5221* (2013.01); *D06P 1/5257* (2013.01); *D06P 1/65118* (2013.01); *D06P 5/004* (2013.01); *D06P 5/30* (2013.01)

(58) Field of Classification Search
CPC ..................................................... C09D 11/38
See application file for complete search history.

(56) References Cited

U.S. PATENT DOCUMENTS

| | | | |
|---|---|---|---|
| 5,954,866 A * | 9/1999 | Ohta | C09D 11/322 106/31.68 |
| 6,409,330 B1 * | 6/2002 | Nakamura et al. | 347/103 |
| 6,419,733 B1 | 7/2002 | Sano et al. | |
| 7,749,316 B2 | 7/2010 | Mizushima et al. | |
| 7,959,725 B2 * | 6/2011 | Yamamoto | C09D 11/40 106/31.6 |
| 8,163,820 B2 * | 4/2012 | Kaji | C09B 67/0002 524/430 |
| 2002/0009547 A1 | 1/2002 | Ito et al. | |
| 2002/0175986 A1 * | 11/2002 | Miyamoto | 347/106 |
| 2005/0036019 A1 | 2/2005 | Maekawa et al. | |
| 2005/0093947 A1 | 5/2005 | Maekawa et al. | |
| 2007/0283845 A1 * | 12/2007 | Mizusaki et al. | 106/31.58 |
| 2009/0169765 A1 * | 7/2009 | Nakamura et al. | 427/511 |

FOREIGN PATENT DOCUMENTS

| | | |
|---|---|---|
| CN | 101016428 | 8/2007 |
| JP | 2000-095990 | 4/2000 |

(Continued)

OTHER PUBLICATIONS

Chinese Office Action, Apr. 28, 2015; Chinese Patent Application No. 201480001036.X (10 pages).

Primary Examiner — Stephen Meier
Assistant Examiner — John P Zimmermann
(74) Attorney, Agent, or Firm — Hamre, Schumann, Mueller & Larson, P.C.

(57) ABSTRACT

A sublimating dye ink for ink jets of the present invention contains water, a sublimating dye, a humectant and an anionic polymer dispersant. The anionic polymer dispersant is a styrene-(meth)acrylic acid-based copolymer having an acid value of 160 to 250 mgKOH/g and a weight average molecular weight of 8,000 to 20,000. The ink contains further as a penetrant an acetylene glycol-based compound expressed by a chemical formula (I) below. A sublimation transfer dyeing method of the present invention includes: inkjet printing the ink on a sheet recording medium; and superposing a printed surface of the recording medium on an object to be dyed, then heating to sublimate-transfer the sublimating dye to the object to be dyed. Thereby, the present invention provides a sublimating dye ink for ink jets containing a sublimating dye, which has high-quality and stable recording performance, maintains the ink storage stability, and at the same time, the ink has a high print density on a surface of a recording medium, and reduces environmental pollution during a dyeing process.

[Chemical formula 1]

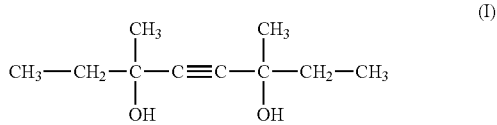

(I)

20 Claims, No Drawings

(56) References Cited

FOREIGN PATENT DOCUMENTS

| JP | 2001-294789 | 10/2001 |
| JP | 2002-201428 | 7/2002 |
| JP | 2004-107647 | 4/2004 |
| JP | 2004-107648 | 4/2004 |
| JP | 2006-160950 | 6/2006 |
| JP | 2008-291079 | 12/2008 |
| JP | 2010-053197 | 3/2010 |
| JP | 2011-021133 | 2/2011 |
| WO | WO 99/05230 | 2/1999 |

* cited by examiner

SUBLIMATING DYE INK FOR INK JETS AND DYEING METHOD

TECHNICAL FIELD

The present invention relates to a sublimating dye ink for ink jets and a dyeing method using the same with regard to an inkjet recording system.

BACKGROUND ART

Water-based ink for inkjet recording is used generally in the form of a solution obtained by dissolving a water-soluble dye in either water or an aqueous solution including a water-soluble organic solvent, or a dispersion liquid obtained by dispersing a water-insoluble color material into water or an aqueous solution including a water-soluble organic solvent. On the other hand, ink for inkjet recording, which includes a sublimating dye, has been used for a sublimation transfer dyeing. In the sublimation transfer method, the ink including a sublimating dye is inkjet-printed on a sheet recording medium such as transfer paper, and then a printed surface of the recording medium is superposed on an object to be dyed such as a hydrophobic fiber product, and sublimate-transferred by heating. Properties required for ink for the inkjet recording are as follows:
(1) prevention of nozzle clogging, ejection stability;
(2) high-quality recording images resulting from uniformity in the direction of ink ejected, the ejection amount, and the dot shape;
(3) ink storage stability;
(4) high print density, high-quality image; and
(5) quick drying and fixation of ink.

In an inkjet recording system, ink should be ejected as ink droplets from thin nozzles. Therefore, (1) is particularly important. In particular, when the inkjet recording system is of the on-demand type, the ejection of ink from the nozzles is stopped temporarily even during a continuous operation. This may lead to an ejection failure during a long continuous operation. Unlike a case of using a water-soluble dye, since the ink for inkjet recording for sublimation transfer is applied as a dispersion liquid using a sublimating dye, it tends to cause clogging, e.g., because precipitates (aggregates) are generated by the degradation of dispersibility and moisture is evaporated from the nozzles, resulting in increased viscosity, for example. In particular, when the apparatus is not operated for a long time, clogging is likely to occur due to evaporation of moisture. Therefore, a humectant is added to suppress the evaporation of moisture. Examples of the humectant include a high-boiling water-soluble organic solvent, a solid water-soluble compound and the like. Examples of the high-boiling water-soluble organic solvent include polyhydric alcohol-based compounds such as glycerin and polyethylene glycol; and pyrrolidone-based compounds such as 2-pyrrolidone, and N-methyl-2-pyrrolidone. For the solid water-soluble compound, saccharides, urea-based compounds and the like may be used.

The sublimating dye ink is used generally in the form of a liquid obtained by dispersing the sublimating dye into an aqueous solution including water, a water-soluble organic solvent and a dispersant. However, when the sublimating dye ink is inkjet printed on a sheet recording medium like transfer paper and then a printed surface of the recording medium is superposed on an object to be transferred and the object is dyed by sublimation transfer by heating, or when the sublimating dye ink is inkjet printed on a fabric formed of a hydrophobic fiber material and then the fabric is dyed by heating, the water-soluble organic solvent is evaporated with water during the heating treatment. This point differs from inkjet printing that is used only for general printing purposes. The sublimation transfer dyeing method requires heating for a predetermined time at temperatures higher than the sublimation point of the sublimating dye. Therefore, even a high-boiling organic solvent may be evaporated. Particularly with a high-boiling organic solvent such as glycerin, the temperature decreases to the condensation point shortly after the evaporated solvent is released into the atmosphere, thus causing smoky steam. This is considered to be undesirable because the appearance is degraded significantly. One possibility for avoiding such a problem is to use a humectant that does not cause any smoky steam (see Patent documents 1-2 below, for example).

Patent document 1 recites an ink for inkjet recording for sublimation transfer that reduces environmental pollution and that has favorable redispersibility. The ink contains a sugar alcohol having 4 or more OH groups as a humectant, a dispersant, and a polyoxyethylene alkyl ether-based compound having an alkyl group having a carbon number of 25 to 150. Since ink for inkjet recording for the sublimation transfer in Patent document 1 includes both an anionic dispersant and a compound based on polyoxyethylene alkyl ether having an alkyl group having a carbon number of 25 to 150 for the purpose of improving the redispersibility, the surface tension tends to be decreased. Thus, in a case where a sheet recording medium such as transfer paper or a fabric formed of a hydrophobic fiber material is subjected to an inkjet printing, excessive penetration may be exhibited with respect to the recording medium, and thereby the density on the surface of the recording medium tends to be lower.

Patent document 2 recites a water-based ink for inkjet recording for sublimation transfer, which contains two types of dispersants, polyglycerin having an average polymerization degree of 2 to 12, and polyol. For the two types of dispersants, an anionic dispersant such as β-naphthalene sulfonate formalin condensate, a nonionic dispersant such as phytosterol ethylene oxide adduct etc. are recited. Patent document 3 recites a water-based ink composition. In the composition, the average dispersed particle diameter of a water-insoluble coloring agent is 0.1 to 0.3 μm, the acid value of the styrene-acrylic acid-based copolymer in the form of free acid is 150 mgKOH/g or more and less than 250 mgKOH/g, and the ratio of the styrene-acrylic acid-based copolymer with respect to the water-insoluble coloring agent is 5 mass % or more and less than 20 mass %. Patent document 3 recites that an extremely high recording density can be achieved by setting the average dispersed particle diameter of the water-insoluble coloring agent to a certain and relatively-large range of 0.1 to 0.3 μm. However, since the ratio of the styrene-acrylic acid-based copolymer with respect to the water-insoluble coloring agent is 5 mass % or more and less than 20 mass %, the dispersion stability (ink storage stability) of the water-insoluble coloring agent is not sufficient. Patent document 4 recites an ink containing a particular pigment, namely an ink composition including an acetylene glycol compound as a penetrant and including a styrene-(meth)acrylic acid-based water-soluble resin as a water-soluble dispersant. It is recited that the ink composition including a particular pigment together with a particular ingredient provides an image having excellent friction resistance and color reproducibility, and it obtains advantages as an ultra-penetrating ink composition. The weight average molecular weight of the styrene-(meth)acrylic acid-based water-soluble resin recited in each of Examples in Patent document 4 is limited to 7,000, the acid value is recited as 70 to 150, and the acetylene glycol compound is not specified. In Examples, as the acetylene glycol compound, only "Surfynol 465" is recited.

Patent document 5 recites an inkjet ink containing a disperse dye. The inkjet ink has either a carboxyl group or a sulfonic acid group as an acidic group, and contains a polymer resin in the range of 2 mass % to 10 mass % inclusive by the solid content, the polymer resin has an acid value of not less than 80 mgKOH and not more than 300 mgKOH. The polymer resin is used not as a dispersant but as a binder resin. With the inkjet ink, a high-quality and highly durable image can be formed by only heating a fabric. Patent document 6 recites an inkjet ink for sublimation transfer to a polyester cloth. The ink contains a sublimating dye, an acetylene glycol-based surfactant, a specific water-soluble organic solvent and water. However, the acetylene glycol-based surfactant is not specified, while there is a recitation of only "Surfynol 465" as an acetylene glycol compound in the Examples. For the dispersant of the sublimating dye, an anionic dispersant (sodium salt of β-naphthalenesulfonate formalin condensate) is used in the Examples.

PRIOR ART DOCUMENTS

Patent documents

Patent document 1: JP 2004-107648
Patent document 2: JP 2011-21133
Patent document 3: JP 2001-294789
Patent document 4: brochure of WO 1999/005230
Patent document 5: JP 2008-291079
Patent document 6: JP 2010-53197

DISCLOSURE OF INVENTION

Problem to be Solved by the Invention

As mentioned above, the conventional technique has difficulty in raising the print density on a surface of a recording medium while maintaining the high-quality and stable recording performance and ink storage stability. It is also difficult to reduce environmental pollution during a dyeing process.

In order to solve the above-mentioned problems in the ink for inkjet recording using a conventional sublimating dye as mentioned above, the present invention provides a sublimating dye ink for ink jets and a dyeing method using the same. The ink containing a sublimating dye has a high-quality and stable recording performance, maintains its ink storage stability, and at the same time, realizes a high print density on a recording medium surface, and reduces environmental pollution during a dyeing process.

Means for Solving Problem

A sublimating dye ink for ink jets of the present invention is a sublimating dye ink for ink jets, containing water, a sublimating dye, a humectant, and an anionic polymer dispersant. The anionic polymer dispersant is a styrene-(meth) acrylic acid-based copolymer having an acid value of 160 to 250 mgKOH/g and a weight average molecular weight of 8,000 to 20,000. The sublimating dye ink for ink jets further contains, as a penetrant, an acetylene glycol-based compound expressed by a chemical formula (I) below.

[Chemical formula 1]

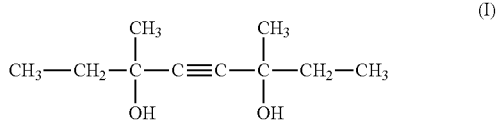

(I)

A sublimation transfer dyeing method of the present invention is a sublimation transfer dyeing method comprising: inkjet printing the above-mentioned sublimating dye ink for ink jets on a sheet recording medium; superposing a printed surface of the recording medium on an object to be dyed, then heating to sublimate-transfer the sublimating dye to the object to be dyed.

Effects of the Invention

The present invention can provide an excellent sublimating dye ink for ink jets. The ink containing a sublimating dye has a high-quality and stable recording performance that has been required, maintains its ink storage stability, and at the same time, realizes a high print density on a surface of a recording medium, and reduces environmental pollution during a dyeing process. Furthermore, a dyeing method that uses the sublimating dye ink for ink jets of the present invention can provide a sublimation transfer dyeing method that realizes a high dyeing density on a surface of an object to be dyed and that reduces environmental pollution.

DESCRIPTION OF THE INVENTION

With regard to a reliable sublimating dye ink for ink jets that rarely causes clogging at the inkjet head, the inventors studied dispersants and penetrants for a sublimating dye in order to obtain an ink composition having a high print density on a recording medium. As a result of such studies, the inventors have found that the object can be achieved by selecting a particular anionic polymer dispersant and a particular penetrant, resulting in the present invention.

The anionic polymer dispersant used in the present invention is a styrene-(meth)acrylic acid-based copolymer having an acid value of 160 to 250 mgKOH/g (hereinafter, each acid value is indicated simply as a numerical value), and a weight average molecular weight of 8,000 to 20,000. A characteristic of the present invention is to use the anionic polymer dispersant as the dispersant for the sublimating dye. The anionic polymer dispersant pulverizes the sublimating dye and disperses it in an aqueous medium. The dispersant exhibits also a function of retaining the dispersion stability of the pulverized sublimating dye.

Examples of the styrene-(meth)acrylic acid-based copolymer include: a styrene-acrylic acid copolymer, a styrene-methacrylic acid copolymer, a styrene-acrylic acid-acrylic ester copolymer, a styrene-methacrylic acid-acrylic ester copolymer, a styrene-α methylstyrene-acrylic acid copolymer, and a styrene-α methylstyrene-methacrylic acid copolymer.

The styrene-(meth)acrylic acid-based copolymer used in the present invention has an acid value in the range of 160 to 250, preferably 200 to 250. When the acid value is less than 160, the solubility of resin with respect to water deteriorates, and the dispersion stability with respect to the sublimating dye tends to be degraded. When the acid value exceeds 250, the affinity with the aqueous medium becomes strong, and bleeding tends to occur easily on the printed image, which is not favorable. The acid value of resin represents the amount of KOH in mg necessary for neutralizing 1 g of resin, and it is measured in accordance with JIS-K3054.

The weight average molecular weight of the styrene-(meth)acrylic acid-based copolymer is 8,000 to 20,000, preferably 10,000 to 18,000. When the weight average molecular weight is smaller than 8,000, the dispersion stability with respect to the sublimating dye deteriorates. When the weight average molecular weight is larger than 20,000, the capability of dispersing the sublimating dye deteriorates, and furthermore the viscosity of the ink may be increased excessively, neither of which is favorable. The weight average molecular weight of the styrene-(meth)acrylic acid-based copolymer is measured by use of GPC (gel permission chromatograph) method.

For the styrene-(meth)acrylic acid-based copolymers, a flake-shaped product or a product as an aqueous solution have been commercially available From the viewpoint of handling, an aqueous solution is used favorably. Specific examples include products of BASF Japan Ltd. with trade names: "Joncryl 60" (weight average molecular weight=8,500; acid value=215), "Joncryl 62" (weight average molecular weight=8,500; acid value=200), "Joncryl 63" (weight average molecular weight=12,500; acid value=213), "Joncryl 70" (weight average molecular weight=16,500; acid value=240), "HPD-71" (weight average molecular weight=17,250; acid value=214), and "HPD-96" (weight average molecular weight=16,500; acid value=240).

The content of any of these anionic polymer dispersants is preferably 0.2 to 4 mass % with respect to the total mass of ink for the purpose of keeping the dispersion stability of the ink favorably. Further, the content of any of these anionic polymer dispersants is preferably 20 to 40 mass %, and more preferably 20 to 30 mass % with respect to the sublimating dye for the purpose of keeping the dispersion stability of the sublimating dye favorably.

Another characteristic of the present invention is that it contains as a penetrant the acetylene glycol-based compound expressed by the chemical formula (I). The chemical name of the compound expressed by the chemical formula (I) is 3,6-dimethyl-4-octyne-3,6-diol, and the product is commercially available as "Surfynol 82" (trade name) from Nissin Chemical Industry Co., Ltd.

In general, examples of an acetylene glycol-based compound include: 2,5-dimethyl-3-hexyne-2,5-diol, 4,7-dimethyl-5-decyne-4,7-diol, 2,4,7,9-tetramethyl-5-decyne-4,7-diol, and 3,6-dimethyl-4-octyne-3,6-diol; and products formed by adding an ethyleneoxy group and/or a propylene oxy group to each of the 2,5-dimethyl-3-hexyne-2,5-diol, the 4,7-dimethyl-5-decyne-4,7-diol, the 2,4,7,9-tetramethyl-5-decyne-4,7-diol, and the 3,6-dimethyl-4-octyne-3,6-diol. These are commercially available with trade names "Surfynol 82", 104, 420, 440, 465, 485 etc. (manufactured by Nissin Chemical Industry Co., Ltd.). For the sublimating dye ink in the present invention, 3,6-dimethyl-4-octyne-3,6-diol as the compound of the chemical formula (I) (trade name: "Surfynol 82") is used.

It is possible to obtain an ink composition having a high print density on a surface of a recording medium, by selecting the anionic polymer dispersant as the dispersant for a sublimating dye and selecting the compound of the chemical formula (I) as the penetrant.

In this case, since a combination of the anionic polymer dispersant and any other acetylene glycol-based compound would form an ink composition having a high penetrability, it would be impossible to raise the print density on the recording medium surface.

It is considered that since the compound of the chemical formula (I) has a milder penetrating effect in comparison with any of the other acetylene glycol-based compounds, the penetrability of the ink into the recording medium is also mild, and since the sublimating dye remains on or in the vicinity of the surface, the density on the surface of the recording medium is raised. Furthermore, the storage stability of ink is also favorable when the compound of the chemical formula (I) is used, while the storage stability of the ink composition deteriorates when any other acetylene glycol-based compound is used.

From the viewpoint of maintaining the solubility to the ink and mild penetrability into the recording medium, the content of the compound of the chemical formula (I) is preferably 0.1 to 2.0 mass %, more preferably 0.1 to 1.5 mass % and further preferably 0.2 to 1.0 mass % with respect to the total amount of the ink.

The sublimating dye used in the present invention can be either a disperse dye or a solvent dye, both having a sublimation property. These dyes can be used alone or as a mixture, and the disperse dye is particularly preferred from the viewpoint of dispersibility and dyeing property.

Dyes that are sublimated or evaporated at 70 to 260° C. under atmospheric pressure are suitable for the sublimating dye. The examples include: azo, anthraquinone, quinophthalone, styryl, oxazine, xanthene, methine, and azomethine. Among these dyes, examples of a yellow disperse dye include (dye name) "C. I. Disperse Yellow 51", 54, 60, 64, 65, 71, 82, 98, 114, 119, 160, 201 and 211. Examples of an orange disperse dye include "C. I. Disperse Orange 25", 33, 44, and 288. Examples of a red disperse dye include "C. I. Disperse Red 4", 22, 55, 59, 60, 73, 86, 91, 146, 152, 191, 302, and 364. Examples of a blue disperse dye include "C. I. Disperse Blue 14", 28, 56, 60, 72, 73, 77, 334, 359, 360 and 366. Other color components are, e.g., "C. I. Disperse Brown 27"; "C.I. Disperse Violet 26", 27, 28 and the like. Examples of the other solvent dye include "C. I. Solvent Yellow 16", 33, 93, and 160; "C. I. Solvent Orange 60"; "C. I. Solvent Red 111", 155; "C. I. Solvent Violet 31"; "C. I. Solvent Blue 35", 36, 59, 63, 97, and 104.

Among these, "C. I. Disperse Yellow 54", 60, 64, 71, 82; "C. I. Disperse Orange 25", 288; "C. I. Disperse Red 4", 22, 55, 60, 146, 302, 364; "C. I. Disperse Blue 14", 28, 56, 72, 334, 359, 360; "C. I. Disperse Violet 28"; "C. I. Solvent Yellow 16", 33, 93; "C. I. Solvent Orange 60"; "C. I. Solvent Red 111", 155; "C. I. Solvent Violet 31"; "C. I. Solvent Blue 35", 36, 59, 63, 97, 104 etc. are preferred.

To keep the dispersion stability and to provide the required print density in general, the content of the sublimating dye is preferably 0.2 to 12 mass %, and more preferably 0.5 to 10 mass % with respect to the total mass of ink.

In the present invention, the anionic polymer dispersant used in the present invention pulverizes the sublimating dye and disperse it into an aqueous medium, and the dispersant exhibits also a function of retaining the dispersion stability of the pulverized sublimating dye.

Furthermore, it is possible to use an anionic surfactant, a nonionic surfactant and the like during a preparation of ink. In particular, for the purpose of further improving the dispersion stability of the disperse dye or the solvent dye, preferably 0.1 to 3 mass % of the anionic surfactant with respect to the total mass of ink is contained.

Examples of the anionic surfactant include naphthalene sulfonate formalin condensate, lignin sulfonates, aromatic sulfonate formalin condensate (e.g., a formalin condensate of sodium alkyl naphthalene sulfonate such as sodium butylnaphthalene sulfonate and sodium naphthalene sulfonate, a formalin condensate of sodium cresol sulfonate and 2-naphthol-6-sulfonic acid sodium, sodium cresol sulfonate formalin condensate, or sodium creosote oil sulfonate formalin condensate), and polyoxyethylene alkyl ether sulfate.

Among them, naphthalene sulfonate formalin condensate and aromatic sulfonate formalin condensate are preferred.

The humectant used in the sublimating dye ink for ink jets of the present invention is preferably a sugar alcohol derived from a monosaccharide or a sugar alcohol derived from a disaccharide. Examples of the sugar alcohol derived from a monosaccharide include threitol, erythritol, arabitol, ribitol, xylitol, lyxitol, sorbitol, mannitol, iditol, gulitol, talitol, galactitol, allitol, and altritol. Examples of the sugar alcohol derived from a disaccharide include maltitol, isomaltitol, lactitol, and turanitol. Among the above examples, sorbitol, xylitol, and maltitol are preferred from the viewpoint of favorable solubility. Sorbitol is particularly preferred from the viewpoint of solubility and cost efficiency.

To adjust the ink viscosity and to prevent clogging by utilizing a moisture retention effect, the content of the sugar alcohol is preferably 5 to 30 mass % with respect to the total mass of ink. The content is preferably 5 to 20 mass % when any other humectant is used together.

A water-soluble organic solvent may be used as a humectant, as long as it does not impede the purpose of the present invention. Examples of the water-soluble organic solvent include glycerin, diglycerin, polyglycerin, ethylene glycol, propylene glycol, 1,3-propanediol, diethylene glycol, triethylene glycol, polyethylene glycol, dipropylene glycol, tripropylene glycol, polypropylene glycol, 2-pyrolidone, N-methylpyrrolidone, dimethyl sulfoxide, sulfolane and the like. It is also possible to use the sugar alcohol and the water-soluble organic solvent together.

Among the above water-soluble organic solvents, as the solvent that does not generate a considerable amount of smoky steam, diglycerin, ethylene glycol, propylene glycol, 1,3-propanediol, and polyglycerin (average polymerization degree: 3 to 10) are preferred. Among them, diglycerin and propylene glycol are further preferred.

They may be used alone or as a mixture of at least two. It is preferable that the water-soluble organic solvent is used together with the sugar alcohol. To adjust the ink viscosity and to prevent clogging by utilizing a moisture retention effect, the content of each of the water-soluble organic solvents is preferably 5 to 40 mass %, more preferably 10 to 40 mass %, and further preferably 15 to 35 mass % with respect to the total mass of ink.

In addition to the above materials, the ink of the present invention may include various additives, if necessary, as long as they do not impede the object of the present invention. Examples of the additives include a surface tension control agent, a hydrotropic agent, a pH regulator, a viscosity modifier, a preservative, an antifungal agent, a rust-preventive agent, an antioxidant, an anti-reduction agent, a light stabilizer, a chelating agent, and an antifoaming agent. For the pH regulator, an organic amine, an alkali metal hydroxide or the like can be used. For the antifoaming agent, an acetylene glycol-based compound other than the compound of the chemical formula (I) (e.g., trade name "Surfynol 104E" manufactured by Nissin Chemical Industry Co., Ltd.) can be used. The use amount is preferably 0.01 to 0.1 mass % since a larger use amount will decrease the print density.

A method for producing a sublimating dye ink for ink jets of the present invention is not particularly limited. For example, a preferred method includes the following:

(1) A sublimating dye, a styrene-(meth)acrylic acid-based copolymer and water are mixed and stirred to prepare a predispersion liquid. In this case, a humectant or any of the above additives may be added as needed.

(2) The predispersion liquid is placed in a wet mill (e.g., a sand mill) so that the sublimating dye is pulverized into fine particles and dispersed, thereby producing a sublimating dye dispersion liquid.

(3) To the sublimating dye dispersion liquid are added water and the compound of the chemical formula (I) and, if necessary, a humectant and any of the above additives, and then the concentration is adjusted. The resultant liquid is filtered, e.g., through a filter paper before use as a sublimating dye ink for ink jets.

In the above-mentioned method, the styrene-(meth)acrylic acid-based copolymer may be added further at the time of adjusting the concentration for the purpose of improving the dispersibility of the sublimating dye. In this method, in a case where the humectant is a sugar alcohol, from the viewpoint of workability, it is preferable to use an aqueous solution that is prepared beforehand or a commercially available aqueous solution. The average particle size of the sublimating dye obtained by the above method is preferably not more than 200 nm, and more preferably in the range of 50 to 150 nm.

The foregoing explanation only gives some specific examples of a sublimating dye, a humectant, a styrene-(meth)acrylic acid-based copolymer, the compound of the chemical formula (I) and other components, and the present invention is not limited thereto.

A method of sublimation transfer dyeing by use of the above-mentioned sublimating dye ink for ink jets of the present invention includes: inkjet printing the sublimating dye ink for ink jets on a sheet recording medium like a transfer paper; and superposing the printed surface of the recording medium on an object to be dyed such as a hydrophobic fiber or a resin film product, and then heating with a hot plate, an oven or the like so as to sublimate-transfer the sublimating dye onto the object to be dyed.

Examples of the sheet recording medium used in the above-mentioned method include not only an uncoated sheet recording medium such as regular paper but a sheet recording medium formed of a sheet support having a coating layer containing at least a hydrophilic polymer and/or an inorganic porous material.

The shape or material of the object to be dyed is not particularly limited, as long as it can be dyed by sublimation transferring. In general, a fabric of hydrophobic fibers or a flat material such as a resin film or a resin plate is used. However, not only the flat materials but also three-dimensional, e.g., spherical or cubic materials can be used.

The heating temperature for sublimation transfer depends on the type or the like of a sublimating dye to be used, and generally is about 150 to 220° C. The heating time is about 0.1 to 10 minutes.

It is also possible to conduct an inkjet textile printing by using the above-mentioned sublimating dye ink for ink jets of the present invention. The inkjet textile printing method can be conducted for example in the following manner. First, the sublimating dye ink for ink jets is set in a piezo-type inkjet printer so as to be ejected on a polyester cloth that has been pre-treated for bleed prevention or the like, thereby a desired image can be formed. Further, the cloth is heated at temperature of 150 to 220° C. for example, so as to dye the polyester fibers with the sublimating dye. Later, unfixed sublimating dye, unfixed additives such as dispersant, unfixed pre-treatment agent and the like are removed if necessary by reduction cleaning and washing in water, and drying is conducted to obtain a dyed object of the image.

EXAMPLES

Hereinafter, the present invention will be described in more detail by way of examples. However, the present invention is not limited to the following examples. In each of the examples, "parts" indicates "mass by weight" and "%" indicates "mass %" unless otherwise noted.

Working Example 1

A mixture including 100 parts of red disperse dye dry cake (C. I. Disperse Red 60), 100 parts of "Joncryl 63" as an anionic polymer dispersant (30% resin aqueous solution of ammonia neutralized substance of styrene-(meth)acrylic acid-based copolymer; weight average molecular weight is 12,500; acid value is 213) and 300 parts of water was obtained. This mixture was pulverized for 35 hours in a sand mill using 1500 parts of zircon beads with a diameter of 0.4 mm, thus producing a dispersion liquid.

To 25 parts of the dispersion liquid were added 15 parts of "SORBITOL S" as a sugar alcohol (70% aqueous solution of D-sorbitol manufactured by Nikken Chemicals Co., Ltd.), 1 part of "Surfynol 82" as an acetylene glycol-based compound of the chemical formula (I) (manufactured by Nissin Chemical Industry Co., Ltd.), 20 parts of diglycerin and 39 parts of water, so that ink with an adjusted dye concentration of 5% was obtained. The average particle size of the dye was 100 nm.

Working Examples 2-4

Inks for Working Examples 2-4 were produced in the same manner as Working Example 1 except that the content of "Surfynol 82" was changed to 0.2 parts, 1.5 parts and 1.8 parts respectively, so that inks with adjusted dye concentrations of 5% were obtained. The average particle size of the dye was 100 nm.

Working Example 5

A dispersion liquid was produced through pulverization in the same manner as Working Example 1 except that 100 parts of yellow disperse dye dry cake (C. I. Disperse Yellow 54) was used in place of the red disperse dye dry cake. To 15 parts of the dispersion liquid were added 15 parts of "SORBITOL S", 1 part of "Surfynol 82", 20 parts of diglycerin and 49 parts of water, so that ink with an adjusted dye concentration of 3% was obtained. The average particle size of the dye was 110 nm.

Working Example 6

A dispersion liquid was produced through pulverization in the same manner as Working Example 1 except that 100 parts of blue disperse dye dry cake (C. I. Disperse Blue 72) was used in place of the red disperse dye dry cake. To 25 parts of the dispersion liquid were added 15 parts of "SORBITOL S", 1 part of "Surfynol 82", 20 parts of diglycerin and 39 parts of water, so that ink with an adjusted dye concentration of 5% was obtained. The average particle size of the dye was 110 nm.

Working Example 7

A dispersion liquid was produced through pulverization in the same manner as Working Example 1 except that 100 parts of blue disperse dye dry cake (C. I. Disperse Blue 359) was used in place of the red disperse dye dry cake. To 25 parts of the dispersion liquid were added 15 parts of "SORBITOL S", 1 part of "Surfynol 82", 20 parts of diglycerin and 39 parts of water, so that ink with an adjusted dye concentration of 5% was obtained. The average particle size of the dye was 90 nm.

Working Example 8

Ink with an adjusted dye concentration of 5% was obtained through pulverization in the same manner as Working Example 1 except that 67 parts of "Joncryl 63" and 333 parts of water were used. The average particle size of the dye was 100 nm.

Working Example 9

Ink with an adjusted dye concentration of 1% was obtained from 5 parts of dispersion liquid produced in the same manner as Working Example 1 to which 15 parts of "SORBITOL S", 1 part of "Surfynol 82", 20 parts of diglycerin and 59 parts of water were added. The average particle size of the dye was 100 nm.

Working Example 10

A mixture including 100 parts of red disperse dye dry cake (C. I. Disperse Red 60), 133 parts of "Joncryl 63" and 267 parts of water was obtained. This mixture was pulverized for 35 hours in a sand mill using 1500 parts of zircon beads with a diameter of 0.4 mm, thus producing a dispersion liquid.

To 50 parts of the dispersion liquid were added 15 parts of "SORBITOL 5", 1 part of "Surfynol 82", 20 parts of diglycerin and 14 parts of water, so that ink with an adjusted dye concentration of 10% was obtained. The average particle size of the dye was 100 nm.

Working Example 11

A dispersion liquid was produced through pulverization in the same manner as Working Example 1 except that 98 parts of "Joncryl 61" as an anionic polymer dispersant (30.5% resin aqueous solution of ammonia neutralized substance of styrene-(meth)acrylic acid-based copolymer; weight average molecular weight is 12,000, acid value is 195) and 302 parts of water were used. To 25 parts of the dispersion liquid were added 15 parts of "SORBITOL 5", 1 part of "Surfynol 82", 20 parts of diglycerin and 39 parts of water, so that ink with an adjusted dye concentration of 5% was obtained. The average particle size of the dye was 100 nm.

Working Example 12

A dispersion liquid was produced through pulverization in the same manner as Working Example 1 except that 100 parts of "Joncryl 70" as an anionic polymer dispersant (30% resin aqueous solution of ammonia neutralized substance of styrene-(meth)acrylic acid-based copolymer; weight average molecular weight is 16,500, acid value is 240) was used. To 25 parts of the dispersion liquid were added 15 parts of "SORBITOL 5", 1 part of "Surfynol 82", 20 parts of diglycerin and 39 parts of water, so that ink with an adjusted dye concentration of 5% was obtained. The average particle size of the dye was 100 nm.

Working Example 13

To 25 parts of the dispersion liquid produced in the same manner as Working Example 1 were added 15 parts of "SOR- BITOL S", 1 part of "Surfynol 82", 20 parts of diglycerin, 1.5 parts of "DEMOL N" as an anionic surfactant (sodium salt of β-naphthalene sulfonate formalin condensate, manufactured by Kao Corporation) and 37.5 parts of water, so that ink with an adjusted dye concentration of 5% was obtained. The average particle size of the dye was 100 nm.

Working Example 14

To 25 parts of the dispersion liquid produced in the same manner as Working Example 1 were added 15 parts of "SORBITOL S", 1 part of "Surfynol 82", 20 parts of diglycerin, 1.5 parts of "DEMOL SNB" as an anionic surfactant (aromatic sodium sulfonate formalin condensate, manufactured by Kao Corporation) and 37.5 parts of water, so that ink with an adjusted dye concentration of 5% was obtained. The average particle size of the dye was 100 nm.

Working Example 15

To 25 parts of the dispersion liquid produced in the same manner as Working Example 1 were added 40 parts of "SORBITOL S", 1 part of "Surfynol 82" and 34 parts of water, so that ink with an adjusted dye concentration of 5% was obtained. The average particle size of the dye was 100 nm.

Working Example 16

To 25 parts of the dispersion liquid produced in the same manner as Working Example 1 were added 1 part of "Surfynol 82", 30 parts of diglycerin and 44 parts of water, so that ink with an adjusted dye concentration of 5% was obtained. The average particle size of the dye was 100 nm.

Working Example 17

To 25 parts of the dispersion liquid produced in the same manner as Working Example 1 were added 1 part of "Surfynol 82", 30 parts of propylene glycol and 44 parts of water, so that ink with an adjusted dye concentration of 5% was obtained. The average particle size of the dye was 100 nm.

Working Examples 18-24

To each 25 parts of the dispersion liquids produced in the same manner as Working Example 1 were added a predetermined amount of humectant recited in Table 1 or 2, 1 part of "Surfynol 82" and water, so that inks with adjusted dye concentrations of 5% were obtained. The average particle size of the dyes was 100 nm.

Comparative Examples 1-5

Inks of Comparative Examples 1-5 were produced in the same manner as Working Example 1 except that "Surfynol 82" in Working Example 1 was replaced respectively by "Surfynol 104E" (acetylene glycol-based compound manufactured by Nissin Chemical Industry Co., Ltd.), "Surfynol 465" (ethylene oxide adduct of Surfynol 104, manufactured by Nissin Chemical Industry Co., Ltd.), "BYK-348" (silicon-based surfactant manufactured by BYK Japan K.K.), diethylene glycol monobutyl ether, and 1,2-hexanediol. The average particle size of the dye in each Comparative Example was 100 nm.

Comparative Example 6

A mixture including 100 parts of red disperse dye dry cake (C. I. Disperse Red 60), 81 parts of "Joncryl 57" as an anionic polymer dispersant (37% resin aqueous solution of ammonia neutralized substance of styrene-(meth)acrylic acid-based copolymer; weight average molecular weight is 4,900; acid value is 215) and 319 parts of water was obtained. This mixture was pulverized for 35 hours in a sand mill using 1500 parts of zircon beads with a diameter of 0.4 mm, thus producing a dispersion liquid. To 25 parts of the dispersion liquid were added 15 parts of "SORBITOL S", 1 part of "Surfynol 82", 20 parts of diglycerin and 39 parts of water, so that ink with an adjusted dye concentration of 5% was obtained. The average particle size of the dye was 110 nm.

Comparative Example 7

A mixture including 100 parts of red disperse dye dry cake (C. I. Disperse Red 60), 100 parts of "DEMOL N" as a dispersant and 300 parts of water was obtained. This mixture was pulverized for 35 hours in a sand mill using 1500 parts of zircon beads with a diameter of 0.4 mm, thus producing a dispersion liquid. To 25 parts of the dispersion liquid were added 15 parts of "SORBITOL S", 1 part of "Surfynol 82", 20 parts of diglycerin and 39 parts of water, so that ink with an adjusted dye concentration of 5% was obtained. The average particle size of the dye was 120 nm.

Comparative Example 8

A mixture including 100 parts of red disperse dye dry cake (C. I. Disperse Red 60), 70 parts of "DEMOL N" as a dispersant, 30 parts of "UNITHOX 480" (ethylene oxide adduct of linear chain alcohol having average carbon number of 30, manufactured by Petrolite Corporation in the United States) and 300 parts of water was obtained. This mixture was pulverized for 35 hours in a sand mill using 1500 parts of zircon beads with a diameter of 0.4 mm, thus producing a dispersion liquid. To 25 parts of the dispersion liquid were added 15 parts of "SORBITOL S", 1 part of "Surfynol 82", 20 parts of diglycerin and 39 parts of water, so that ink with an adjusted dye concentration of 5% was obtained. The average particle size of the dye was 110 nm.

Comparative Examples 9-12

Inks of Comparative Examples 9-12 were produced in the same manner as Working Example 10 except that diglycerin in Working Example 10 was replaced respectively by glycerin, diethylene glycol, polyethylene glycol (average molecular weight; 300) and dipropylene glycol. The average particle size of the dye in each of the Comparative Examples was 100 nm.

The following tests were conducted for the inks produced in the above Working Examples and Comparative Examples. The test results are shown in Tables 1-3. The numerical values for the respective materials in Tables 1-3 indicate mass parts. The respective measurements of the tests in Tables 1-3 are conducted in the following manner.

(1) Ejection Test

Each of the inks produced in the above Working Examples and Comparative Examples was applied to a single-color solid printing for 10 hours by using a commercially available large-format inkjet plotter ("JV4-130" manufactured by Mimaki Engineering Co., Ltd.) under conditions of 360×540 dpi, three-pass system, bidirectional and a printing width of 1200 mm. After the printing, the 180 nozzles in total were examined to count the number of nozzles that failed to eject normally.

Evaluations:
A: the number of nozzles not ejecting normally is 0 to 2;
B: the number of nozzles not ejecting normally is 3 to 9; and
C: the number of nozzles not ejecting normally is 10 or more.

(2) Sublimation Transfer Dyeing Test (Generation of Smoky Steam):

Each of the inks produced in the above Working Examples and Comparative Examples was applied to a single-color solid printing on a commercially available sublimation transfer paper for inkjet printing ("CT-JET100" manufactured by KIMOTO CO., LTD.) by using a commercially available large-format inkjet plotter ("JV4-130" (piezo-type) manufactured by Mimaki Engineering Co., Ltd.) under conditions of 360×540 dpi, three-pass system, bidirectional and 300 mm×400 mm (longitudinally and transversely). Next, the sublimation paper was superposed on a polyester cloth and heat-pressed at 200° C. for 1 minute with a hot plate so as to perform a transfer dyeing. Generation of smoky steam during the process was checked visually.

Evaluations:
A: generation of smoky steam is not recognized;
B: generation of a small amount of smoky steam was recognized; and
C: generation of a considerable amount of smoky steam was recognized.

Sublimation Transfer Dyeing Test (Density Feeling)

Each of the inks produced in the above Working Examples and Comparative Examples was applied to a single-color solid printing on a commercially available sublimation transfer paper for inkjet printing ("CT-JET100" manufactured by KIMOTO CO., LTD.) by using a commercially available large-format inkjet plotter ("JV4-130" (piezo-type) manufactured by Mimaki Engineering Co., Ltd.) under conditions of 360×540 dpi, three-pass system, bidirectional and 300 mm×400 mm (longitudinally and transversely), and the print density on the sublimation transfer paper was checked visually. Next, the sublimation transfer paper was superposed on a polyester cloth and heat-pressed for 1 minute at 200° C. with a hot plate so as to perform a transfer-dyeing. The density feeling of the dyed cloth was checked visually.

Evaluations:
A: the print density of sublimation transfer paper is high, and dye density of transfer-dyed cloth is high;
B: the print density of sublimation transfer paper is a little low, and the dye density of transfer-dyed cloth is a little low; and
C: the print density of sublimation transfer paper is considerably low, and the dye density of transfer-dyed cloth is considerably low.

(4) Sublimation Textile Printing-Dyeing Test (Density Feeling)

Each of the inks produced in the above Working Examples and Comparative Examples was applied to a single-color solid printing on a commercially available pre-treated polyester cloth for inkjet printing "Dairiki Super Pongee" manufactured by DAIRIKI K.K.) by using a large-format inkjet plotter ("TX2-160" (piezo-type) manufactured by Mimaki Engineering Co., Ltd.) under conditions of 360×540 dpi, three-pass system, bidirectional and 300 mm×400 mm (longitudinally and transversely), which was then heat-pressed for 1 minute at 200° C. with a hot plate so as to be dyed. The density feeling of the dyed cloth was checked visually.

Evaluations:
A: dye density of the dyed cloth is high;
B: dye density of the dyed cloth is a little low; and
C: dye density of the dyed cloth is considerably low.

(5) Test for Confirmation of Temporal Stability

The inks for inkjet recording for sublimation transfer, produced in Working Examples and Comparative Examples, were stored at 40° C. for one month, and generation of aggregates (precipitates) was checked visually.

Evaluation:
A: aggregates are not generated;
B: a small amount of aggregates are generated; and
C: a great amount of aggregates are generated.

TABLE 1

| | Working Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| C.I.Disperse Yellow-54 | | | | | 3.0 | | | | | | |
| C.I.Disperse Red-60 | 5.0 | 5.0 | 5.0 | 5.0 | | | | 5.0 | 1.0 | 10.0 | 5.0 |
| C.I.Disperse Blue-72 | | | | | | 5.0 | | | | | |
| C.I.Disperse Blue-359 | | | | | | | 5.0 | | | | |
| Surfynol 82 | 1.0 | 0.2 | 1.5 | 1.8 | 1.0 | 1.0 | 1.0 | 1.0 | 1.0 | 1.0 | 1.0 |
| Surfynol 104E | | | | | | | | | | | |
| Surfynol 465 | | | | | | | | | | | |
| BYK-348 | | | | | | | | | | | |
| Diethylene glycol monobutyl ether | | | | | | | | | | | |
| 1,2-hexanediol | | | | | | | | | | | |
| Joncryl 63 (in terms of solid content) | 1.5 | 1.5 | 1.5 | 1.5 | 0.9 | 1.5 | 1.5 | 1.0 | 0.3 | 4.0 | |
| Joncryl 61 (in terms of solid content) | | | | | | | | | | | 1.5 |
| Joncryl 70 (in terms of solid content) | | | | | | | | | | | |
| Joncryl 57 (in terms of solid content) | | | | | | | | | | | |
| DEMOL N | | | | | | | | | | | |
| DEMOL SNB | | | | | | | | | | | |
| UNITHOX 480 | | | | | | | | | | | |
| SORBITOL S (in terms of solid content) | 10.5 | 10.5 | 10.5 | 10.5 | 10.5 | 10.5 | 10.5 | 10.5 | 10.5 | 10.5 | 10.5 |
| Diglycerin | 20.0 | 20.0 | 20.0 | 20.0 | 20.0 | 20.0 | 20.0 | 20.0 | 20.0 | 20.0 | 20.0 |
| Propylene glycol | | | | | | | | | | | |
| Ethylene glycol | | | | | | | | | | | |
| 1,3-propanediol | | | | | | | | | | | |
| Glycerin | | | | | | | | | | | |
| Diethylene glycol | | | | | | | | | | | |
| Polyethylene glycol (average molecular weight: 300) | | | | | | | | | | | |
| Dipropylene glycol | | | | | | | | | | | |
| Ejection performance | A | A | A | A | A | A | A | A | A | A | A |
| Condition at sublimation transfer (steam) | A | A | A | A | A | A | A | A | A | A | A |
| Density feeling (sublimation transfer dyeing) | A | A | A | A | A | A | A | A | A | A | A |

TABLE 1-continued

| | | | | | | | | | | | |
|---|---|---|---|---|---|---|---|---|---|---|---|
| Density feeling (sublimation printing-dyeing) | A | A | A | A | A | A | A | A | A | A | A |
| Temporal ink stability | A | A | A | A | A | A | A | A | A | A | A |

| | Working Example No. | | | | | | | |
|---|---|---|---|---|---|---|---|---|
| | 12 | 13 | 14 | 15 | 16 | 17 | 18 | 19 |
| C.I.Disperse Yellow-54 | | | | | | | | |
| C.I.Disperse Red-60 | 5.0 | 5.0 | 5.0 | 5.0 | 5.0 | 5.0 | 5.0 | 5.0 |
| C.I.Disperse Blue-72 | | | | | | | | |
| C.I.Disperse Blue-359 | | | | | | | | |
| Surfynol 82 | 1.0 | 1.0 | 1.0 | 1.0 | 1.0 | 1.0 | 1.0 | 1.0 |
| Surfynol 104E | | | | | | | | |
| Surfynol 465 | | | | | | | | |
| BYK-348 | | | | | | | | |
| Diethylene glycol monobutyl ether | | | | | | | | |
| 1,2-hexanediol | | | | | | | | |
| Joncryl 63 (in terms of solid content) | | 1.5 | 1.5 | 1.5 | 1.5 | 1.5 | 1.5 | 1.5 |
| Joncryl 61 (in terms of solid content) | | | | | | | | |
| Joncryl 70 (in terms of solid content) | 1.5 | | | | | | | |
| Joncryl 57 (in terms of solid content) | | | | | | | | |
| DEMOL N | | 1.5 | | | | | | |
| DEMOL SNB | | | 1.5 | | | | | |
| UNITHOX 480 | | | | | | | | |
| SORBITOL S (in terms of solid content) | 10.5 | 10.5 | 10.5 | 28.0 | | | 10.5 | 10.5 |
| Diglycerin | 20.0 | 20.0 | 20.0 | | 30.0 | | | |
| Propylene glycol | | | | | | 30.0 | 20.0 | |
| Ethylene glycol | | | | | | | | 20.0 |
| 1,3-propanediol | | | | | | | | |
| Glycerin | | | | | | | | |
| Diethylene glycol | | | | | | | | |
| Polyethylene glycol (average molecular weight: 300) | | | | | | | | |
| Dipropylene glycol | | | | | | | | |
| Ejection performance | A | A | A | A | A | A | A | A |
| Condition at sublimation transfer (steam) | A | A | A | A | A | A | A | A |
| Density feeling (sublimation transfer dyeing) | A | A | A | A | A | A | A | A |
| Density feeling (sublimation printing-dyeing) | A | A | A | A | A | A | A | A |
| Temporal ink stability | A | A | A | A | A | A | A | A |

TABLE 2

| | Working Example No. | | | | |
|---|---|---|---|---|---|
| | 20 | 21 | 22 | 23 | 24 |
| C.I.Disperse Yellow-54 | | | | | |
| C.I.Disperse Red-60 | 5.0 | 5.0 | 5.0 | 5.0 | 5.0 |
| C.I.Disperse Blue-72 | | | | | |
| C.I.Disperse Blue-359 | | | | | |
| Surfynol 82 | 1.0 | 1.0 | 1.0 | 1.0 | 1.0 |
| Surfynol 104E | | | | | |
| Surfynol 465 | | | | | |
| BYK-348 | | | | | |
| Diethylene glycol monobutyl ether | | | | | |
| 1,2-hexanediol | | | | | |
| Joncryl 63 (in terms of solid content) | 1.5 | 1.5 | 1.5 | 1.5 | 1.5 |
| Joncryl 61 (in terms of solid content) | | | | | |
| Joncryl 70 (in terms of solid content) | | | | | |
| Joncryl 57 (in terms of solid content) | | | | | |
| DEMOL N | | | | | |
| DEMOL SNB | | | | | |
| UNITHOX 480 | | | | | |
| SORBITOL S (in terms of solid content) | 10.5 | 10.5 | 14.0 | 17.5 | 10.5 |
| Diglycerin | | 5.0 | 5.0 | 5.0 | |
| Propylene glycol | | 15.0 | 10.0 | 5.0 | 10.0 |
| Ethylene glycol | | | | | 10.0 |
| 1,3-propanediol | 20.0 | | | | |
| Glycerin | | | | | |
| Diethylene glycol | | | | | |
| Polyethylene glycol (average molecular weight: 300) | | | | | |
| Dipropylene glycol | | | | | |
| Ejection performance | A | A | A | A | A |
| Condition at sublimation transfer (steam) | A | A | A | A | A |
| Density feeling (sublimation transfer dyeing) | A | A | A | A | A |
| Density feeling (sublimation printing-dyeing) | A | A | A | A | A |
| Temporal ink stability | A | A | A | A | A |

TABLE 3

| | Comparative Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| C.I.Disperse Yellow-54 | | | | | | | | | | | | |
| C.I.Disperse Red-60 | 5.0 | 5.0 | 5.0 | 5.0 | 5.0 | 5.0 | 5.0 | 5.0 | 5.0 | 5.0 | 5.0 | 5.0 |
| C.I.Disperse Blue-72 | | | | | | | | | | | | |
| C.I.Disperse Blue-359 | | | | | | | | | | | | |

TABLE 3-continued

| | Comparative Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Surfynol 82 | | | | | | 1.0 | 1.0 | 1.0 | 1.0 | 1.0 | 1.0 | 1.0 |
| Surfynol 104E | 1.0 | | | | | | | | | | | |
| Surfynol 465 | | 1.0 | | | | | | | | | | |
| BYK-348 | | | 1.0 | | | | | | | | | |
| Diethylene glycol monobutyl ether | | | | 1.0 | | | | | | | | |
| 1,2-hexanediol | | | | | 1.0 | | | | | | | |
| Joncryl 63 (in terms of solid content) | 1.5 | 1.5 | 1.5 | 1.5 | 1.5 | | | | 1.5 | 1.5 | 1.5 | 1.5 |
| Joncryl 61 (in terms of solid content) | | | | | | | | | | | | |
| Joncryl 70 (in terms of solid content) | | | | | | | | | | | | |
| Joncryl 57 (in terms of solid content) | | | | | | 1.5 | | | | | | |
| DEMOL N | | | | | | | 5.0 | 3.5 | | | | |
| DEMOL SNB | | | | | | | | | | | | |
| UNITHOX 480 | | | | | | | | 1.5 | | | | |
| SORBITOL S (in terms of solid content) | 10.5 | 10.5 | 10.5 | 10.5 | 10.5 | 10.5 | 10.5 | 10.5 | | | | |
| Diglycerin | 20.0 | 20.0 | 20.0 | 20.0 | 20.0 | 20.0 | 20.0 | 20.0 | | | | |
| Propylene glycol | | | | | | | | | | | | |
| Ethylene glycol | | | | | | | | | | | | |
| 1,3-propanediol | | | | | | | | | | | | |
| Glycerin | | | | | | | | | 30.0 | | | |
| Diethylene glycol | | | | | | | | | | 30.0 | | |
| Polyethylene glycol (average molecular weight: 300) | | | | | | | | | | | 30.0 | |
| Dipropylene glycol | | | | | | | | | | | | 30.0 |
| Ejection performance | A | A | A | A | A | A | A | A | A | A | A | A |
| Condition at sublimation transfer (steam) | A | A | A | A | A | A | A | A | C | C | C | C |
| Density feeling (sublimation transfer dyeing) | B | B | C | B | B | A | B | C | A | A | A | A |
| Density feeling (sublimation printing-dyeing) | B | B | C | B | B | A | B | C | A | A | A | A |
| Temporal ink stability | C | C | B | C | B | B | B | A | A | A | A | A |

These test results show that the inks including "Joncryl 63" and "Surfynol 82" in Working Examples 1-24 of the present invention exhibited stable recording performance, ink storage stability, high print density on a recording medium surface, and reduced environmental pollution during a dyeing process. The inks in Comparative Examples 1-5 included "Surfynol 104E", "Surfynol 465", "BYK-348", diethylene glycol monobutyl ether and 1,2-hexanediol respectively in place of "Surfynol 82". Although the inks exhibited stable recording performance, the print density was low because the ink penetrated into the recording medium, and the ink storage stability was unfavorable. The ink in Comparative Example 6 including "Joncryl 57" of a low molecular weight in place of "Joncryl 63" had insufficient ink storage stability. The ink in Comparative Example 7 including "DEMOL N" in place of "Joncryl 63" penetrated into the recording medium, and thus the print density was lowered, and the ink storage stability was unfavorable. The ink in Comparative Example 8 including "DEMOL N" in place of "Joncryl 63" and further including "UNITHOX 480" penetrated into the recording medium, and as a result the print density was low. The inks in Comparative Examples 9-12 using glycerin, diethylene glycol, polyethylene glycol (average molecular weight: 300) and dipropylene glycol as humectants respectively exhibited stable recording performance, ink storage stability, and high print density on a recording medium. However, the inks were considerably inferior from the viewpoint of environmental pollution during a dyeing process.

INDUSTRIAL APPLICABILITY

An ink for inkjet recording of the present invention that uses a sublimating dye as a color component has the effects of not only maintaining required performances such as high-quality and stable recording performance and ink storage stability, but also achieving a high print density on a surface of recording medium and reducing environmental pollution during a dyeing process. Thus, the excellent ink of the present invention containing such a sublimating dye as a color component is suitable for an ink for ink jets, and for a dyeing method using thereof.

The invention claimed is:
1. A sublimating dye ink for ink jets, containing water, a sublimating dye, a humectant, and an anionic polymer dispersant,
wherein the anionic polymer dispersant is a styrene-(meth)acrylic acid-based copolymer having an acid value of 160 to 250 mgKOH/g and a weight average molecular weight of 8,000 to 20,000, and
the sublimating dye ink for ink jets further contains, as a penetrant, an acetylene glycol compound expressed by a chemical formula (I) below:

[Chemical formula 1]

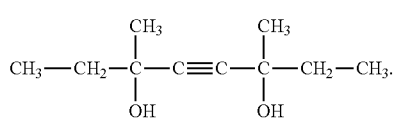

(I)

2. The sublimating dye ink for ink jets according to claim 1, wherein the humectant is at least one selected from the group consisting of: a sugar alcohol derived from a monosaccharide, a sugar alcohol derived from a disaccharide, diglycerin, propylene glycol, ethylene glycol, 1,3-propanediol, and polyglycerin having an average polymerization degree of 3 to 10.

3. The sublimating dye ink for ink jets according to claim 1, wherein the weight average molecular weight of the anionic polymer dispersant is 10,000 to 18,000.

4. The sublimating dye ink for ink jets according to claim 1, wherein the content of the styrene-(meth)acrylic acid-based copolymer is 0.2 to 4 mass % with respect to the total mass of ink.

5. The sublimating dye ink for ink jets according to claim 1, further comprising an anionic surfactant in the range of 0.1 to 3 mass % with respect to the total mass of ink.

6. The sublimating dye ink for ink jets according to claim 1, wherein the humectant is at least one sugar alcohol selected from the group consisting of sorbitol, xylitol and maltitol.

7. The sublimating dye ink for ink jets according to claim 6, wherein the sugar alcohol is contained in the range of 5 to 30 mass % with respect to the total mass of ink.

8. The sublimating dye ink for ink jets according to claim 6, wherein the sugar alcohol is sorbitol.

9. The sublimating dye ink for ink jets according to claim 1, wherein the humectant is at least one selected from the group consisting of diglycerin, propylene glycol, ethylene glycol, 1,3-propanediol and polyglycerin having an average polymerization degree of 3 to 10, and the humectant is contained in the range of 5 to 40 mass % with respect to the total mass of ink.

10. The sublimating dye ink for ink jets according to claim 1, wherein the acetylene glycol compound is contained in the range of 0.1 to 2.0 mass % with respect to the total mass of ink.

11. A sublimation transfer dyeing method comprising:
inkjet printing a sublimating dye ink for ink jets on a sheet recording medium,
the sublimating dye ink containing water, a sublimating dye, a humectant, and an anionic polymer dispersant, wherein the anionic polymer dispersant is a styrene-(meth)acrylic acid-based copolymer having an acid value of 160 to 250 mgKOH/g and a weight average molecular weight of 8,000 to 20,000, and the sublimating dye ink for ink jets further contains, as a penetrant, an acetylene glycol compound expressed by a chemical formula (I) below:

[Chemical formula 1]

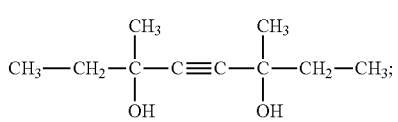

(I)

and
superposing a printed surface of the recording medium on an object to be dyed, then heating to sublimate-transfer the sublimating dye to the object to be dyed.

12. The sublimation transfer dyeing method according to claim 11, wherein the heating is carried out at a temperature in the range of 150 to 220° C. and the heating time is in the range of 0.1 to 10 minutes.

13. The sublimation transfer dyeing method according to claim 11, wherein the humectant is at least one selected from the group consisting of: a sugar alcohol derived from a monosaccharide, a sugar alcohol derived from a disaccharide, diglycerin, propylene glycol, ethylene glycol, 1,3-propanediol, and polyglycerin having an average polymerization degree of 3 to 10.

14. The sublimation transfer dyeing method according to claim 11, wherein the weight average molecular weight of the anionic polymer dispersant is 10,000 to 18,000.

15. The sublimation transfer dyeing method according to claim 11, wherein the content of the styrene-(meth)acrylic acid-based copolymer is 0.2 to 4 mass % with respect to the total mass of ink.

16. The sublimation transfer dyeing method according to claim 11, wherein the ink comprises further an anionic surfactant in the range of 0.1 to 3 mass % with respect to the total mass of ink.

17. The sublimation transfer dyeing method according to claim 11, wherein the humectant is at least one sugar alcohol selected from the group consisting of sorbitol, xylitol and maltitol.

18. The sublimation transfer dyeing method according to claim 17, wherein the sugar alcohol is contained in the range of 5 to 30 mass % with respect to the total mass of ink.

19. The sublimation transfer dyeing method according to claim 11, wherein the humectant is at least one selected from the group consisting of diglycerin, propylene glycol, ethylene glycol, 1,3-propanediol and polyglycerin having an average polymerization degree of 3 to 10, and the humectant is contained in the range of 5 to 40 mass % with respect to the total mass of ink.

20. The sublimation transfer dyeing method according to claim 11, wherein the acetylene glycol compound is contained in the range of 0.1 to 2.0 mass % with respect to the total mass of ink.

* * * * *